United States Patent
Chen et al.

(10) Patent No.: US 10,419,963 B2
(45) Date of Patent: Sep. 17, 2019

(54) SYSTEM, METHOD AND APPARATUS FOR PROCESSING PACKET DATA SERVICE

(71) Applicant: ZTE Corporation, Shenzhen (CN)

(72) Inventors: Shu Chen, Shenzhen (CN); Haiyang Ye, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 65 days.

(21) Appl. No.: 15/551,364

(22) PCT Filed: Sep. 2, 2015

(86) PCT No.: PCT/CN2015/088904
§ 371 (c)(1),
(2) Date: Aug. 16, 2017

(87) PCT Pub. No.: WO2016/131240
PCT Pub. Date: Aug. 25, 2016

(65) Prior Publication Data
US 2018/0035324 A1    Feb. 1, 2018

(30) Foreign Application Priority Data
Feb. 16, 2015   (CN) .......................... 2015 1 0085609

(51) Int. Cl.
*H04W 28/02*  (2009.01)
*H04L 29/08*  (2006.01)
(Continued)

(52) U.S. Cl.
CPC ......... *H04W 28/0205* (2013.01); *H04L 29/08* (2013.01); *H04L 67/289* (2013.01);
(Continued)

(58) Field of Classification Search
None
See application file for complete search history.

(56) References Cited

U.S. PATENT DOCUMENTS

| | | | |
|---|---|---|---|
| 8,719,876 B2 | 5/2014 | Kotecha | |
| 2010/0150057 A1* | 6/2010 | Miklos | H04W 8/082 370/328 |

(Continued)

FOREIGN PATENT DOCUMENTS

| | | |
|---|---|---|
| CN | 102577328 A | 7/2012 |
| CN | 103475947 A | 12/2013 |

(Continued)

OTHER PUBLICATIONS

International Search Report for corresponding application No. PCT/CN2015/088904 filed on Sep. 2, 2015; dated Dec. 11, 2015.

(Continued)

*Primary Examiner* — Lonnie V Sweet
(74) *Attorney, Agent, or Firm* — Cantor Colburn LLP

(57) ABSTRACT

A system, method and apparatus for processing a packet data service are provided. The system may include: an SGSN, configured to acquire at least one of an APN and an RNC identifier in a UMTS, and select, when an RAN CDN has been enabled in the UMTS, the RAN CDN according to at least one of the APN and the RNC identifier to process a packet data service in a UMTS network. Or, the system may include: an MME, configured to acquire at least one of an APN and an eNodeB identifier in an LTE, and select, when an RAN CDN has been enabled in the LTE, the RAN CDN according to at least one of the APN and the eNodeB identifier to process a packet data service in an LTE network.

18 Claims, 7 Drawing Sheets

Acquire at least one of an APN and an RNC identifier in a UMTS — S702

When an RAN CDN has been enabled in the UMTS, select the RAN CDN according to at least one of the APN and the RNC identifier to process a packet data service in a UMTS network — S704

(51) Int. Cl.
    *H04L 29/06*     (2006.01)
    *H04W 76/12*     (2018.01)
    *H04W 48/00*     (2009.01)
    *H04W 28/08*     (2009.01)
    *H04L 29/12*     (2006.01)

(52) U.S. Cl.
    CPC ......... *H04L 69/16* (2013.01); *H04W 28/0273* (2013.01); *H04W 48/17* (2013.01); *H04W 76/12* (2018.02); *H04L 61/1511* (2013.01); *H04L 61/3075* (2013.01); *H04W 28/08* (2013.01)

(56) References Cited

U.S. PATENT DOCUMENTS

| | | | | |
|---|---|---|---|---|
| 2011/0283011 A1* | 11/2011 | Li | ............... | H04L 12/14 709/231 |
| 2013/0315068 A1 | 11/2013 | Kim | | |
| 2015/0039680 A1* | 2/2015 | Gallant | ............... | H04L 65/60 709/203 |
| 2015/0055461 A1* | 2/2015 | Hahn | ............... | H04W 48/20 370/230 |

FOREIGN PATENT DOCUMENTS

| | | |
|---|---|---|
| CN | 103581248 A | 2/2014 |
| EP | 2485537 A1 | 8/2012 |
| EP | 2844022 A1 | 3/2015 |
| WO | 2012012334 A2 | 1/2012 |

OTHER PUBLICATIONS

European Search Report for corresponding application EP15882379; dated Jan. 17, 2018.

* cited by examiner

SYSTEM, METHOD AND APPARATUS FOR PROCESSING PACKET DATA SERVICE

TECHNICAL FIELD

The present disclosure relates to the field of communications, and more particularly to a system, method and apparatus for processing a packet data service.

BACKGROUND

In order to maintain competitiveness of a 3rd generation mobile communication system in the field of communications, to provide a mobile communication service that is higher in rate, lower in delay and more personalized for a user, and to reduce an operation cost of an operator, a 3rd Generation Partnership Project (3GPP) standard working group is being devoted to research on an Evolved Packet System (EPS).

FIG. 1 is a structure diagram of access of a Universal Terrestrial Radio Access Network (UTRAN) to a Packet System (PS). As shown in FIG. 1, the whole PS may be divided into a 3rd Generation (3G) Radio Access Network (RAN) and a 3G Core Network (CN).

The 3G RAN may include a base station (e.g. a NodeB) and a 3G Radio Network Controller (RNC). The 3G RAN is mainly responsible for transmitting and receiving a radio signal, communicating with a terminal through an air interface, managing and scheduling radio resources of the air interface, and performing access control.

The 3G CN may include a Home Location Register (HLR), a Serving General Packet Radio Service (GPRS) Support Node (SGSN) and a Gateway GPRS Support Node (GGSN).

FIG. 2 is a structure diagram of access of an Evolved UTRAN (E-UTRAN) to an EPS. As shown in FIG. 2, the whole EPS may be divided into a 4th Generation (4G) RAN and a 4G CN.

The 4G RAN may include a base station, e.g., an evolved NodeB (eNodeB). The 4G RAN is mainly responsible for transmitting and receiving a radio signal, communicating with a terminal through an air interface, managing and scheduling radio resources of the air interface, and performing access control.

The 4G CN may include a Home Subscriber Server (HSS), a Mobility Management Entity (MME), a Serving Gateway (S-GW) and a Packet Data Network (PDN) Gateway (P-GW).

In the field of broadband communication, a Content Delivery Network (CDN) may be provided to cache contents at different places and orientate a user request for acquiring contents to a nearest cache server through a technology such as load balancing, thereby increasing a network access response speed of a user. The CDN may provide a service in response to a user request in a more efficient manner based on judgment of user proximity and server loads.

To fully utilize advantages of the CDN, a mobile network operator desires to deploy the CDN in a mobile network and to combine the CDN with the mobile network, thereby accelerating content delivery of a mobile user, increasing the response speed and saving bandwidths. The CDN may be deployed over a GGSN or a P-GW and may be naturally supported. However, a problem of deployment of the CDN at other positions of a mobile network, e.g., further sinking of a CDN to a radio network, has not been solved.

Any effective solution has not been proposed yet for a problem that a network element supporting both a network function of a CDN and a network function of a mobile network cannot be selected to process a packet data service in a current system.

SUMMARY

Some embodiments of the present disclosure provide a system, method and apparatus for processing a packet data service, which may solve the abovementioned problem.

According to one embodiment of the present disclosure, a system for processing a packet data service is provided. The system may include an SGSN. The SGSN may be configured to acquire at least one of an APN and an RNC identifier in a Universal Mobile Telecommunications System (UMTS), and select, when an RAN CDN has been enabled in the UMTS, the RAN CDN according to at least one of the APN and the RNC identifier to process a packet data service in a UMTS network.

In the embodiment of the present disclosure, the SGSN may be further configured to select, when the RAN CDN has not been enabled in the UMTS, a GGSN corresponding to the APN according to the APN to process the packet data service in the UMTS network.

In the embodiment of the present disclosure, the SGSN may be further configured to select the RAN CDN according to at least one of the APN and the RNC identifier in a following manner: when the RAN CDN has been enabled in the UMTS, selecting, in a specified network determined according to the APN, the RAN CDN connected with an RNC in accordance with a topological connection relation of the specified network. In the embodiment, the RNC may be indicated by the RNC identifier.

In the embodiment of the present disclosure, the system may further include: the RAN CDN. The RAN CDN may include a CDN and a GGSN. In the embodiment, the CDN and the GGSN may interact through a Transmission Control Protocol/Internet Protocol (TCP/IP).

In the embodiment of the present disclosure, the system may further include: a Domain Name System (DNS), connected with the RAN CDN, and configured to send an IP address of the RAN CDN to the SGSN. In the embodiment, the SGSN may be further configured to send a Packet Data Protocol (PDP) request to the RAN CDN corresponding to the IP address, and the PDP request may be used for requesting the RAN CDN to process packet data received by the RAN CDN.

According to another embodiment of the present disclosure, a system for processing a packet data service is provided. The system may include an MME.

The MME may be configured to acquire at least one of an APN and an eNodeB identifier in an LTE, and select, when an RAN CDN has been enabled in the LTE, the RAN CDN according to at least one of the APN and the eNodeB identifier to process a packet data service in an LTE network.

In the embodiment of the present disclosure, the MME may be further configured to select, when the RAN CDN has not been enabled in the LTE, a System Architecture Evolution Gateway (SAE-GW) corresponding to the APN according to the APN to process the packet data service in the LTE network.

In the embodiment of the present disclosure, the MME may be further configured to, when the RAN CDN has been enabled in the LTE, select, in a specified network determined according to the APN, the RAN CDN connected with an eNodeB in accordance with a topological connection relation of the specified network. In the embodiment, the eNodeB may be indicated by the eNodeB identifier.

In the embodiment of the present disclosure, the system may further include: the RAN CDN, including: a CDN and an SAE-GW. In the embodiment, the CDN and the SAE-GW may interact through a TCP/IP.

In the embodiment of the present disclosure, the system may further include: a DNS, connected with the RAN CDN, and configured to send an IP address of the RAN CDN to the MME. In the embodiment, the MME may be further configured to send a PDP request to the RAN CDN corresponding to the IP address, and the PDP request may be used for requesting the RAN CDN to process packet data received by the RAN CDN.

According to another embodiment of the present disclosure, a method for processing a packet data service is provided. The method may include the following acts. At least one of an APN and an RNC identifier in a UMTS may be acquired. When an RAN CDN has been enabled in the UMTS, the RAN CDN may be selected according to at least one of the APN and the RNC identifier to process a packet data service in a UMTS network.

In the embodiment of the present disclosure, the method may further include an act that, when the RAN CDN has not been enabled in the UMTS, a GGSN corresponding to the APN may be selected according to the APN to process the packet data service in the UMTS network.

In the embodiment of the present disclosure, the act of selecting the RAN CDN according to at least one of the APN and the RNC identifier may include the following act. The RAN CDN connected with an RNC may be selected, in a specified network determined according to the APN, in accordance with a topological connection relation of the specified network. In the embodiment, the RNC may be indicated by the RNC identifier.

In the embodiment of the present disclosure, the RAN CDN may be obtained in a following manner: taking a network element supporting a GGSN and a CDN as the RAN CDN. In the embodiment, the CDN and the GGSN may interact through a TCP/IP.

In the embodiment of the present disclosure, a network function of the RAN CDN may include: a network function supported by a GGSN, a network function supported by an edge CDN, and a transparent cache.

In the embodiment of the present disclosure, after selecting the RAN CDN according to at least one of the APN and the RNC identifier, the method may further include the following acts. A DNS query request may be sent to a DNS, and a DNS query response message corresponding to the DNS query request may be received. An IP address of the RAN CDN may be acquired from the DNS query response message. A PDP request may be sent to the RAN CDN corresponding to the IP address. In the embodiment, the PDP request may be used for requesting the RAN CDN to process packet data received by the RAN CDN.

According to another embodiment of the present disclosure, a method for processing a packet data service is provided. The method may include the following acts. At least one of an APN and an eNodeB identifier in an LTE may be acquired. When an RAN CDN has been enabled in the LTE, the RAN CDN may be selected according to at least one of the APN and the eNodeB identifier to process a packet data service in an LTE network.

In the embodiment of the present disclosure, the method may further include an act that, when the RAN CDN has not been enabled in the LTE, an SAE-GW corresponding to the APN may be selected according to the APN.

In the embodiment of the present disclosure, the act of selecting the RAN CDN according to at least one of the APN and the eNodeB identifier may include the following act. When the RAN CDN has been enabled in the LTE, the RAN CDN connected with an eNodeB may be selected, in a specified network determined according to the APN, in accordance with a topological connection relation of the specified network. In the embodiment, the eNodeB may be indicated by the eNodeB identifier.

In the embodiment of the present disclosure, the RAN CDN may be obtained in a following manner: taking a network element supporting an SAE-GW and a CDN as the RAN CDN. In the embodiment, the CDN and the SAE-GW may interact through a TCP/IP.

In the embodiment of the present disclosure, a network function of the RAN CDN may include: a network function supported by an SAE-GW, a network function supported by an edge CDN, and a transparent cache.

In the embodiment of the present disclosure, after selecting the RAN CDN according to at least one of the APN and the eNodeB identifier, the method may further include the following acts. A DNS query request may be sent to a DNS, and a DNS query response message corresponding to the DNS query request may be received. An IP address of the RAN CDN may be acquired from the DNS query response message. A PDP request may be sent to the RAN CDN corresponding to the IP address.

According to another embodiment of the present disclosure, an apparatus for processing a packet data service is provided. The apparatus may include an acquisition module and a selection module. The acquisition module may be configured to acquire at least one of an APN and an RNC identifier in a UMTS. The selection module may be configured to select, when an RAN CDN has been enabled in the UMTS, the RAN CDN according to at least one of the APN and the RNC identifier to process a packet data service in a UMTS network.

According to another embodiment of the present disclosure, an apparatus for processing a packet data service is provided. The apparatus may include an acquisition module and a selection module. The acquisition module may be configured to acquire at least one of an APN and an eNodeB identifier in an LTE. The selection module may be configured to select, when an RAN CDN has been enabled in the LTE, the RAN CDN according to at least one of the APN and the eNodeB identifier to process a packet data service in an LTE network.

By means of some embodiments of the present disclosure, a solution of preferentially selecting, when an RAN CDN has been enabled in a UMTS, an RAN CDN to process a packet data service in a current UMTS is adopted. Therefore, a problem that a network element supporting both a network function of a CDN and a network function of a mobile network cannot be selected to process a packet data service in a current system may be solved, thereby extending network functions of the UMTS. A way of processing a current packet data service is also provided.

BRIEF DESCRIPTION OF THE DRAWINGS

The drawings illustrated herein are used to provide a further understanding for the present disclosure, and form a part of the present application. The schematic embodiments and illustrations of the present disclosure are used to explain the present disclosure, and do not form any limit to the present disclosure. In the drawings.

DETAILED DESCRIPTION OF THE EMBODIMENTS

The present disclosure will be illustrated hereinbelow with reference to the drawings and in conjunction with embodiments in detail. It is important to note that the embodiments in the present application and the features in the embodiments may be combined under the condition of no conflicts.

Other features and advantages of the present disclosure will be elaborated in the following specification, and become obvious partially from the specification or are understood by implementing the present disclosure. The purposes and other advantages of the present disclosure may be implemented and obtained by means of structures specially pointed out in the specification, the claims and the drawings.

In order to make those skilled in the art better understand the solution of the present disclosure, the solution in the embodiments of the present disclosure will be clearly and completely described hereinbelow with reference to the drawings in the embodiments of the present disclosure.

Obviously, the described embodiments are only a part of the embodiments of the present disclosure, not exhaustion of all possible embodiments. On the basis of the embodiments of the present disclosure, all other embodiments obtained on the premise of no creative work of those skilled in the art shall fall within the scope of protection defined by the appended claims of the present disclosure.

Figure 1:
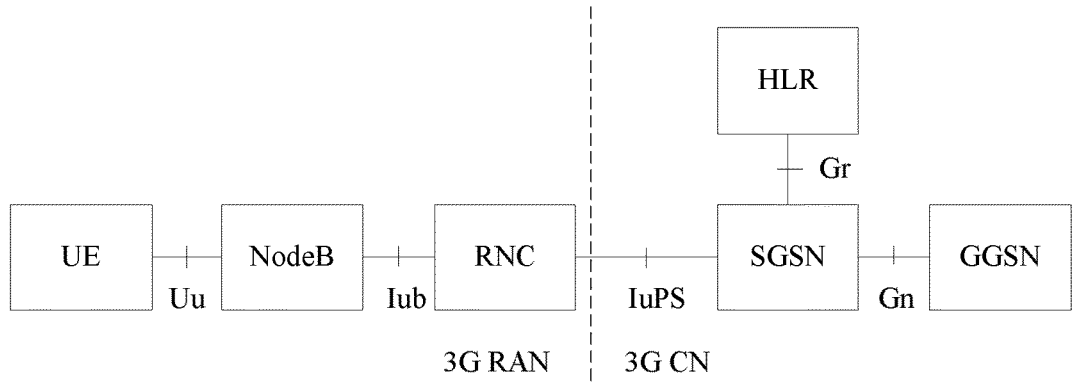
FIG. 1 is a structure diagram of access of a UTRAN to a PS.
Figure 2:
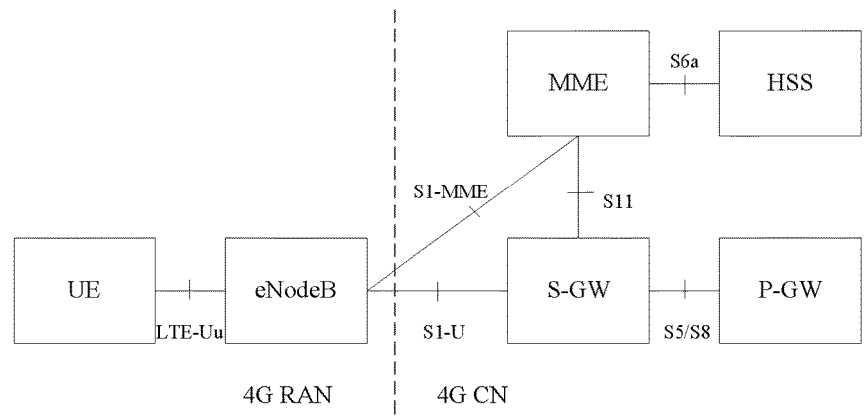
FIG. 2 is a structure diagram of access of an E-UTRAN to an EPS.
Figure 3:
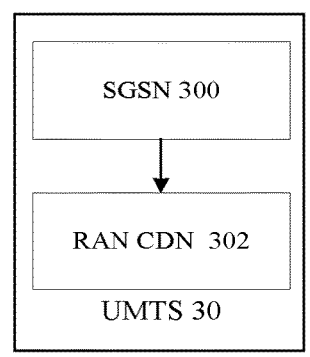
FIG. 3 is a block diagram of a system for processing a packet data service according to an embodiment of the present disclosure.

In an embodiment, a system for processing a packet data service is provided. FIG. 3 is a block diagram of a system for processing a packet data service according to an embodiment of the present disclosure. As shown in FIG. 3, the system may include an SGSN 300.

The SGSN 300 may be configured to acquire at least one of an APN and an RNC identifier in a UMTS 30, and select, when an RAN CDN function has been enabled in the UMTS 30, an RAN CDN 302 according to at least one of the APN and the RNC identifier to process a packet data service in the UMTS 30.

By means of the system for processing a packet data service according to the embodiment of the present disclosure, a solution of preferentially selecting, when an RAN CDN function has been enabled (activated) in the UMTS, an RAN CDN to process a packet data service in a current UMTS is adopted. Therefore, a problem that a network element supporting both a network function of a CDN and a mobile network cannot be selected to process a packet data service in a current system may be solved, thereby extending network functions of the UMTS. A way of processing a current packet data service is also provided.

When the RAN CDN function has not been enabled in the UMTS, the SGSN 300 may be further configured to select a GGSN corresponding to the APN according to the APN to process the packet data service in the UMTS network. That is to say, if the RAN CDN function has been enabled in the network, the RAN CDN may be preferentially selected to process a packet data service in the current UMTS; and if the RAN CDN function is not enabled, the GGSN may be directly selected to process the packet data service in the UMTS network.

Herein, the SGSN 300 may also select the RAN CDN according to the RNC identifier in a following manner. When the RAN CDN function has been enabled in the UMTS, the RAN CDN connected with an RNC may be selected, in a specified network determined according to the APN, in accordance with a topological connection relation of the specified network. In the embodiment, the RNC may be indicated by the RNC identifier.

Figure 4:
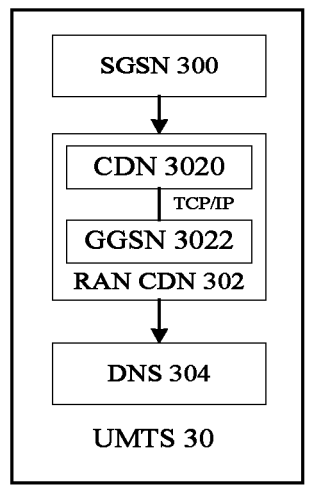
FIG. 4 is another block diagram of a system for processing a packet data service according to an embodiment of the present disclosure.
Figure 5:
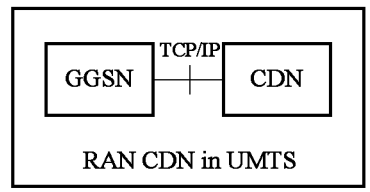
FIG. 5 is a structure diagram of combined deployment of a CDN and a GGSN into an RAN CDN according to an embodiment of the present disclosure.

FIG. 4 is another block diagram of a system for processing a packet data service according to an embodiment of the present disclosure. As shown in FIG. 4, the system for processing a packet data service may further include: an RAN CDN 302, including: a CDN 3020 and a GGSN 3022. The inclusion relation may be interpreted as deployment of a CDN entity and a GGSN in the same gateway. Certainly, there may be other manners, and the deployment manner is not limited in the embodiment of the present disclosure. In the embodiment, the CDN and the GGSN may interact through a TCP/IP (as shown in FIG. 5).

Figure 6:
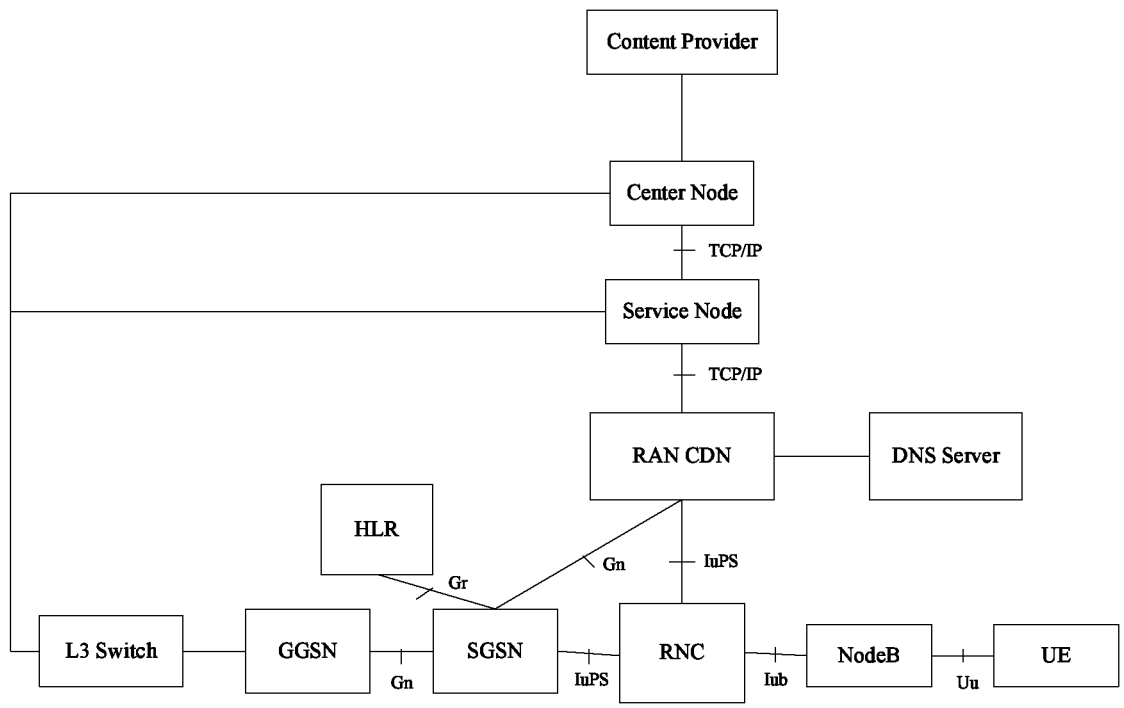
FIG. 6 is an architecture diagram of deployment of an RAN CDN in a UMTS according to an embodiment of the present disclosure.

In order to better implement functions of the system for processing a packet data service, the system may further include: a DNS 304, connected with the RAN CDN 302, and configured to send an IP address of the RAN CDN to the SGSN 300. In the embodiment, the SGSN 300 may be further configured to send a PDP request to the RAN CDN corresponding to the IP address, and the PDP request may be used for requesting the RAN CDN to process packet data received by the RAN CDN. As shown in FIG. 6, FIG. 6 specifically describes a specific situation after a network element with an RAN CDN network function is deployed in a UMTS. In this architecture, devices such as an HLR, an SGSN, a GGSN, an RAN CDN, a DNS server, a service node and a central node may be included. In the embodiment, the DNS server may implement a domain name resolution flow, and may implement local scheduling for a user request according to an IP address of the RAN CDN carried in a DNS response.

Figure 7:
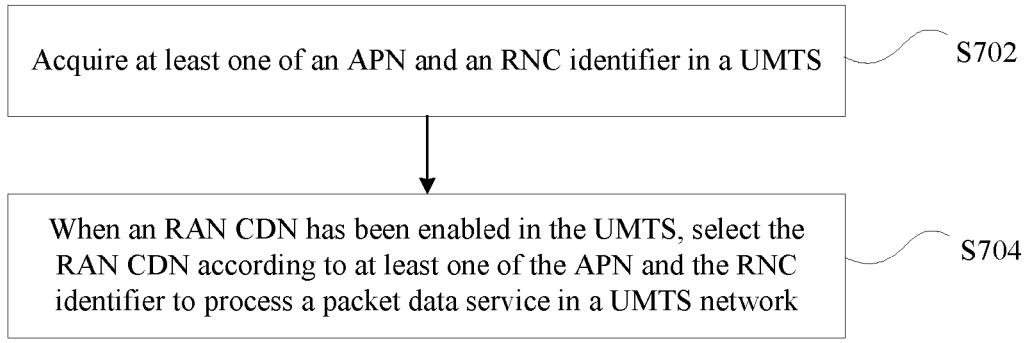
FIG. 7 is a flowchart of a method for processing a packet data service according to an embodiment of the present disclosure.

On the basis of the system for processing a packet data service, in an embodiment of the present disclosure, a method for processing a packet data service is provided. FIG. 7 is a flowchart of a method for processing a packet data service according to an embodiment of the present disclosure. As shown in FIG. 7, the method may include the acts as follows.

At act S702, at least one of an APN and an RNC identifier in a UMTS may be acquired.

At act S704, when an RAN CDN has been enabled in the UMTS, the RAN CDN may be selected according to at least one of the APN and the RNC identifier to process a packet data service in a UMTS network.

By means of each of the abovementioned acts, a solution of preferentially selecting, when an RAN CDN has been enabled (activated) in the UMTS, the RAN CDN to process a packet data service in a current UMTS is adopted. Therefore, a problem that a network element supporting both a network function of a CDN and a mobile network cannot be selected to process a packet data service in a current system may be solved, thereby extending network functions of the UMTS. A way of processing a current packet data service is also provided.

It is important to note that when the RAN CDN has not been enabled in the UMTS, a GGSN corresponding to the APN may be selected according to the APN to process the packet data service in the UMTS network. That is to say, if the RAN CDN has been enabled in the network, the RAN CDN may be preferentially selected to process a packet data service in the current UMTS; if the RAN CDN has not been enabled, the GGSN may be directly selected to process the packet data service in the UMTS network.

In an alternative implementation manner of the embodiment of the present disclosure, the act S702 may be implemented in a following manner. The RAN CDN connected with an RNC may be selected, in a specified network determined according to the APN, in accordance with a topological connection relation of the specified network. In the embodiment, the RNC may be indicated by the RNC identifier.

Herein, a network element supporting a GGSN and a CDN may be taken as the RAN CDN. In the embodiment, the CDN and the GGSN may interact through a TCP/IP. That is, a network function of the RAN CDN may at least include: a network function of the GGSN and a network function of the CDN. More specifically, the network function may be embodied as a network function supported by a GGSN, a network function supported by an edge CDN, and a transparent cache.

In the embodiment of the present disclosure, after executing the act S704, the method may further include the following acts. A DNS query request may be sent to a DNS, and a DNS query response message corresponding to the DNS query request may be received. An IP address of the RAN CDN may be acquired from the DNS query response message. A PDP request may be sent to the RAN CDN corresponding to the IP address. In the embodiment, the PDP request may be used for requesting the RAN CDN to process packet data received by the RAN CDN.

It is important to note that for convenience of simple description, each method embodiment may be expressed as a series of action combinations. However, those skilled in the art shall know that the present disclosure is not limited by the order of described actions. That is because some acts may be executed in other orders or at the same time according to the present disclosure. Secondly, those skilled in the art shall also know that the embodiments described in the specification are all preferable embodiments, and involved actions and modules may not be essential for the present disclosure.

Figure 8:
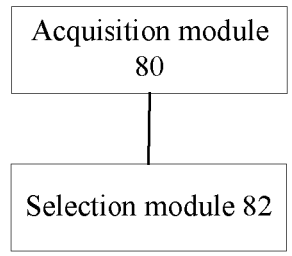
FIG. 8 is a block diagram of an apparatus for processing a packet data service according to an embodiment of the present disclosure.

In another embodiment, an apparatus for processing a packet data service is provided. The apparatus may be applied to an SGSN and may be used to implement the abovementioned embodiment and preferable implementation manner. Those which have been illustrated will not be elaborated herein. Modules involved in the apparatus will be illustrated hereinbelow. Just as a term 'module' used below, the combination of software and/or hardware with predetermined functions may be implemented. Although the apparatus described by the following embodiment is better implemented by software, the implementation of hardware or the combination of software and hardware may be possible and conceived. FIG. 8 is a block diagram of an apparatus for processing a packet data service according to an embodiment of the present disclosure. As shown in FIG. 8, the apparatus may include an acquisition module 80 and a selection module 82.

The acquisition module 80 may be configured to acquire at least one of an APN and an RNC identifier in a UMTS.

The selection module 82 may be connected to the acquisition module 80, and configured to select, when an RAN CDN has been enabled in the UMTS, the RAN CDN according to at least one of the APN and the RNC identifier to process a packet data service in a UMTS network.

Under the combined action of each of the abovementioned modules, a solution of preferentially selecting, when an RAN CDN has been enabled (activated) in the UMTS, the RAN CDN to process a packet data service in a current UMTS is adopted. Therefore, a problem that a network element supporting both a network function of a CDN and a mobile network cannot be selected to process a packet data service in a current system may be solved, thereby extending the UMTS. A way of processing a current packet data service is also provided.

Figure 9:
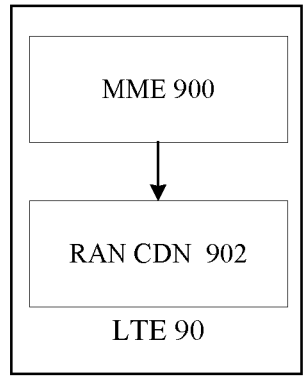
FIG. 9 is another block diagram a of a system for processing a packet data service according to an embodiment of the present disclosure.

In another embodiment, a system for processing a packet data service is provided. FIG. 9 is another block diagram a of a system for processing a packet data service according to an embodiment of the present disclosure. As shown in FIG. 9, the system may include an MME 900.

The MME 900 may be configured to acquire at least one of an APN and an eNodeB identifier in an LTE 90, and select, when an RAN CDN has been enabled in the LTE, the RAN CDN 902 according to at least one of the APN and the eNodeB identifier to process a packet data service in an LTE network.

By means of the system for processing a packet data service according to the embodiment of the present disclosure, a solution of preferentially selecting, when an RAN CDN has been enabled (activated) in the LTE, an RAN CDN to process a packet data service in a current LTE system is adopted. Therefore, a problem that a network element supporting both a network function of a CDN and a mobile network cannot be selected to process a packet data service in a current system may be solved, thereby extending the LTE. A way of processing a current packet data service is also provided.

When the RAN CDN function has not been enabled in the LTE, the MME 900 may be further configured to select an SAE-GW corresponding to the APN according to the APN to process the packet data service in the LTE network. As an exemplary implementation, the MME 900 may be further configured to, when the RAN CDN has been enabled in the LTE, select, in a specified network determined according to the APN, the RAN CDN connected with an eNodeB in accordance with a topological connection relation of the specified network. In the embodiment, the eNodeB may be indicated by the eNodeB identifier.

Figure 10:
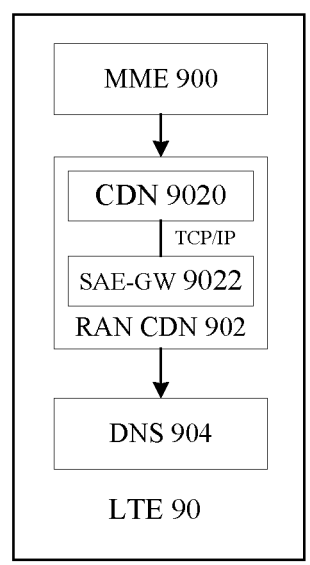
FIG. 10 is another block diagram b of a system for processing a packet data service according to an embodiment of the present disclosure.
Figure 11:
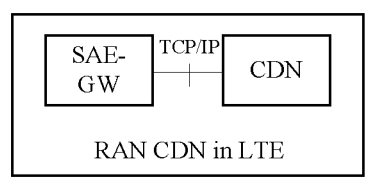
FIG. 11 is a structure diagram of combined deployment of a CDN and an SAE-GW into an RAN CDN according to an embodiment of the present disclosure.

Alternatively, FIG. 10 is another block diagram b of a system for processing a packet data service according to an embodiment of the present disclosure. The system may further include: an RAN CDN 902, including: a CDN 9020 and an SAE-GW 9022. In the embodiment, the CDN and the SAE-GW may interact through a TCP/IP (as shown in FIG. 11).

Figure 12:
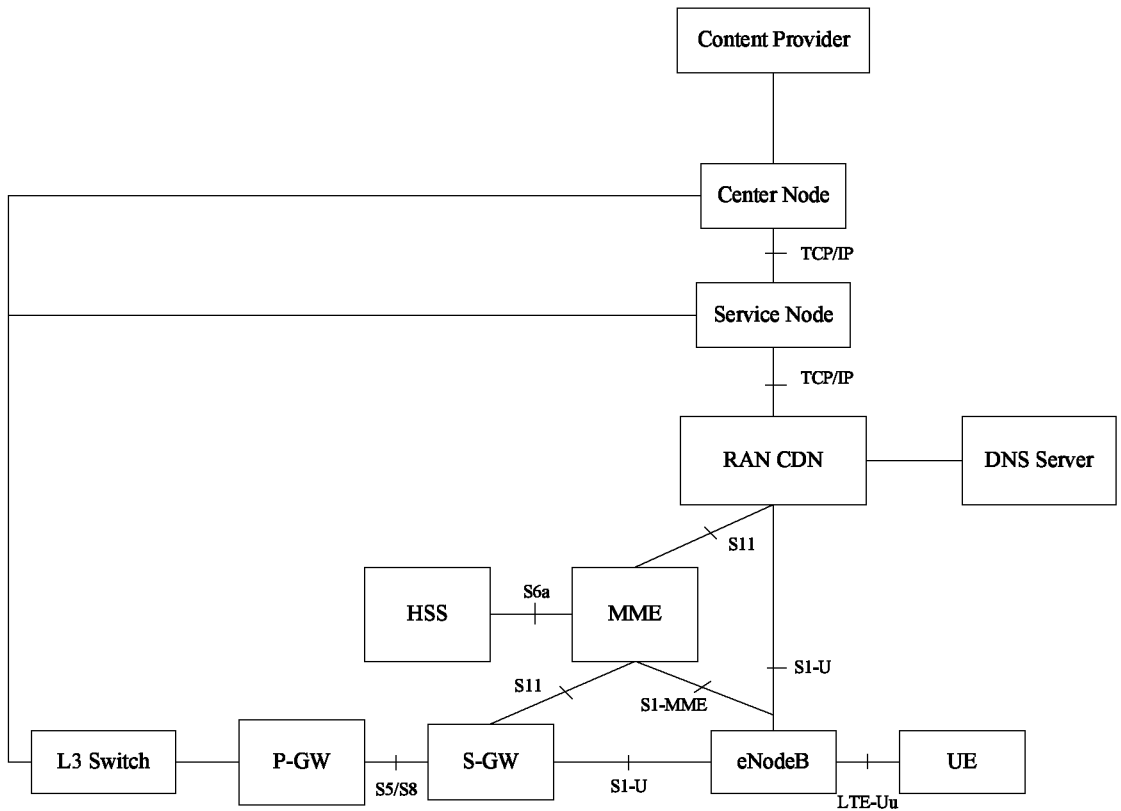
FIG. 12 is an architecture diagram of deployment of an RAN CDN in an LTE according to an embodiment of the present disclosure.

In the embodiment of the present disclosure, the system may further include: a DNS 904, connected with the RAN CDN, and configured to send an IP address of the RAN CDN to the MME. In the embodiment, the MME may be further configured to send a PDP request to the RAN CDN corresponding to the IP address, and the PDP request may be used for requesting the RAN CDN to process packet data received by the RAN CDN. As shown in FIG. 12, an architecture of deploying an RAN CDN in an LTE is specifically described. In this architecture, devices such as an HSS, an MME, an S-GW, a P-GW, an RAN CDN, a DNS server, a service node and a central node may be included. In the embodiment, the DNS server may implement a domain name resolution flow, and may implement local scheduling for a user request according to an IP address of the RAN CDN carried in a DNS response.

Figure 13:
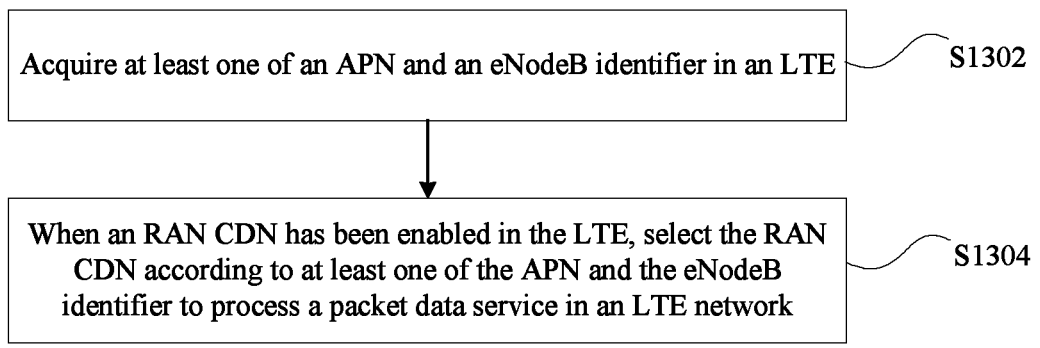
FIG. 13 is another flowchart of a method for processing a packet data service according to an embodiment of the present disclosure.

On the basis of the system for processing a packet data service, in an embodiment of the present disclosure, a method for processing a packet data service is provided. FIG. 13 is another flowchart of a method for processing a packet data service according to an embodiment of the present disclosure. The method may include the acts as follows.

At act S1302, at least one of an APN and an eNodeB identifier in an LTE is acquired.

At act S1304, when an RAN CDN function has been enabled in the LTE, an RAN CDN may be selected according to at least one of the APN and the eNodeB identifier to process a packet data service in an LTE network.

By means of each of the abovementioned acts, a solution of preferentially selecting, when an RAN CDN function has been enabled (activated) in the LTE, an RAN CDN to process a packet data service in a current LTE system is adopted. Therefore, a problem that a network element supporting both a network function of a CDN and a mobile network cannot be selected to process a packet data service in a current system may be solved, thereby extending the LTE. A way of processing a current packet data service is also provided.

When the RAN CDN function has not been enabled in the LTE, an SAE-GW corresponding to the APN may be selected according to the APN.

Alternatively, act S1304 may be implemented by means of the following solution. When the RAN CDN function has been enabled in the LTE, the RAN CDN connected with an eNodeB may be selected, in a specified network determined according to the APN, in accordance with a topological connection relation of the specified network. In the embodiment, the eNodeB may be indicated by the eNodeB identifier.

Herein, the RAN CDN may be obtained in a following manner: taking a network element supporting an SAE-GW and a CDN as the RAN CDN. In the embodiment, the CDN and the SAE-GW may interact through a TCP/IP. The RAN CDN may include: a network function supported by an SAE-GW, a network function supported by an edge CDN, and a transparent cache.

Further, after executing the act S1304, the following process may also be executed. A DNS query request may be sent to a DNS, and a DNS query response message corresponding to the DNS query request may be received. An IP address of the RAN CDN may be acquired from the DNS query response message. A PDP request may be sent to the RAN CDN corresponding to the IP address.

It is important to note that for convenience of simple description, each method embodiment may be expressed as a series of action combinations. However, those skilled in the art shall know that the present disclosure is not limited by the order of described actions. That is because some acts may be executed in other orders or at the same time according to the present disclosure. Secondly, those skilled in the art shall also know that the embodiments described in the specification are merely preferable embodiments, and involved actions and modules may not be essential for the present disclosure.

Figure 14:
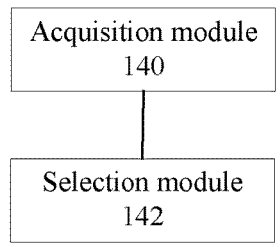
FIG. 14 is another block diagram of an apparatus for processing a packet data service according to an embodiment of the present disclosure.

In another embodiment, an apparatus for processing a packet data service is provided. The apparatus may be applied to an MME and may be used to implement the abovementioned embodiment and preferable implementation manner. Those which have been illustrated will not be elaborated herein. Modules involved in the apparatus will be illustrated hereinbelow. Just as a term 'module' used below, the combination of software and/or hardware with predetermined functions may be implemented. Although the apparatus described by the following embodiment is better implemented by software, the implementation of hardware or the combination of software and hardware may be possible and conceived. FIG. 14 is another block diagram of an apparatus for processing a packet data service according to an embodiment of the present disclosure. As shown in FIG. 14, the apparatus may include an acquisition module 140 and a selection module 142.

The acquisition module 140 may be configured to acquire at least one of an APN and an eNodeB identifier in an LTE.

The selection module 142 may be connected to the acquisition module 140, and configured to select, when an RAN CDN has been enabled in the LTE, the RAN CDN according to at least one of the APN and the eNodeB identifier to process a packet data service in an LTE network.

Under the combined action of each of the abovementioned modules, a solution of preferentially selecting, when an RAN CDN function has been enabled (activated) in the LTE, an RAN CDN to process a packet data service in a current LTE system is adopted. Therefore, a problem that a network element supporting both a network function of a CDN and a mobile network cannot be selected to process a packet data service in a current system may be solved, thereby extending the LTE. A way of processing a current packet data service is also provided.

For convenience of better understanding of the flow of processing a packet data service, the flow will be illustrated hereinbelow with reference to a first preferable embodiment and a second preferable embodiment, but a protected solution illustrated by but not limited by, the embodiments of the present disclosure is not limited by the following first preferable embodiment and the second preferable embodiment.

First Preferable Embodiment

Figure 15:
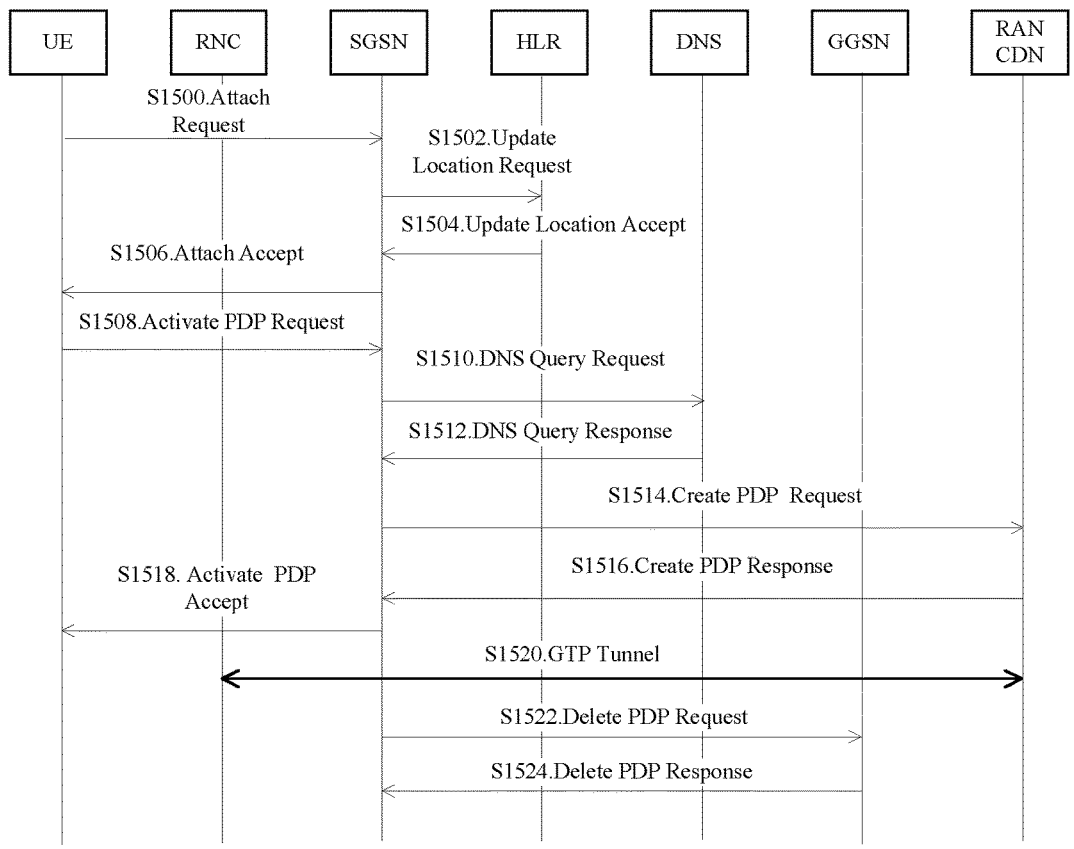
FIG. 15 is a flowchart of selection of an RAN CDN and service provision in a UMTS scenario according to a first preferable embodiment of the present disclosure.

For combined deployment of a CDN and a GGSN, a method for selecting an RAN CDN and providing service in a UMTS scenario is described. As shown in FIG. 15, the method may include the following acts.

At act 1500, a User Equipment (UE) may send an attach request message to an SGSN, and the message may carry parameters such as an APN. In the embodiment, the APN may be an APN for activating an RAN CDN function.

At act 1502, the SGSN may send an update location request message to an HLR.

At act 1504, the HLR may return an update location accept message to the SGSN.

At act 1506, the SGSN may return an attach accept message to the UE, and the UE may be attached to a 3G network.

At act 1508, the UE may send an active PDP request message to the SGSN.

At act 1510, the SGSN may send a DNS query request message to a DNS server.

In the preferable embodiment of the present disclosure, if the APN is the APN for activating the RAN CDN function, the SGSN may expand an APN domain name with an RNC ID in the DNS query request message. For example, the RNC ID may be internet.rnc0001.mnc021.mcc206.gprs, where rnc0001 is an RNC of a coverage area where the UE is located.

In the preferable embodiment of the present disclosure, if the APN is an APN of which the RAN CDN function is not activated, taking Blackberry as an example, then the SGSN may continuously carry in the DNS query request message the original APN, e.g., blackberry.mnc021.mcc206.gprs.

At act 1512, the DNS server may return a DNS query response message to the SGSN. In the present disclosure, the DNS query response message may carry an RAN CDN address.

In the preferable embodiment of the present disclosure, the DNS server may need to modify a DNS resolution file, and a row of configuration records about a correspondence between an RNC ID and an IP address of an RAN CDN may be added. For example, the added configuration records may be as follows:

internet.rnc0001.mnc021.mcc206.gprs IN A 10.5.155.28// For RAN-CDN APN;

blackberry.mnc021.mcc206.gprs IN A 12.5.155.28//For Non RAN-CDN APN.

At act 1514, the SGSN may obtain the RAN CDN address from the DNS query response message, and may send a create PDP request message to the selected RAN CDN.

At act 1516, the RAN CDN may return a create PDP response message to the SGSN.

At act 1518, the SGSN may establish a Radio Access Bearer (RAB) between the SGSN and the RNC. In this process, the SGSN may transmit the IP address of the RAN CDN and a Tunnel Endpoint Identification (TEID) to the RNC. Then, a GPRS Tunnel Protocol for the user plane (GTP-U) tunnel between the RNC and the RAN CDN is successfully established. The SGSN may return an active PDP response message to the UE.

At act 1520, the UE may send data packets to the RAN CDN through the RNC. The RAN CDN may process all data packets, but may cache packet data of which a destination port is 80, 8080, 8088 or 21 only, for convenience of subsequent direct provision of service for a user. The RAN CDN may support all functions relevant to a GPRS Tunnel Protocol for the control plane (GTP-C) and a GTP-U.

Moreover, the RAN CDN may support functions supported by all service nodes.

At act 1522, when the UE initiates a de-active PDP flow, the SGSN may send a delete PDP request message to the RAN CDN.

At act 1524, the RAN CDN may return a delete PDP response message to the SGSN.

Second Preferable Embodiment

Figure 16:
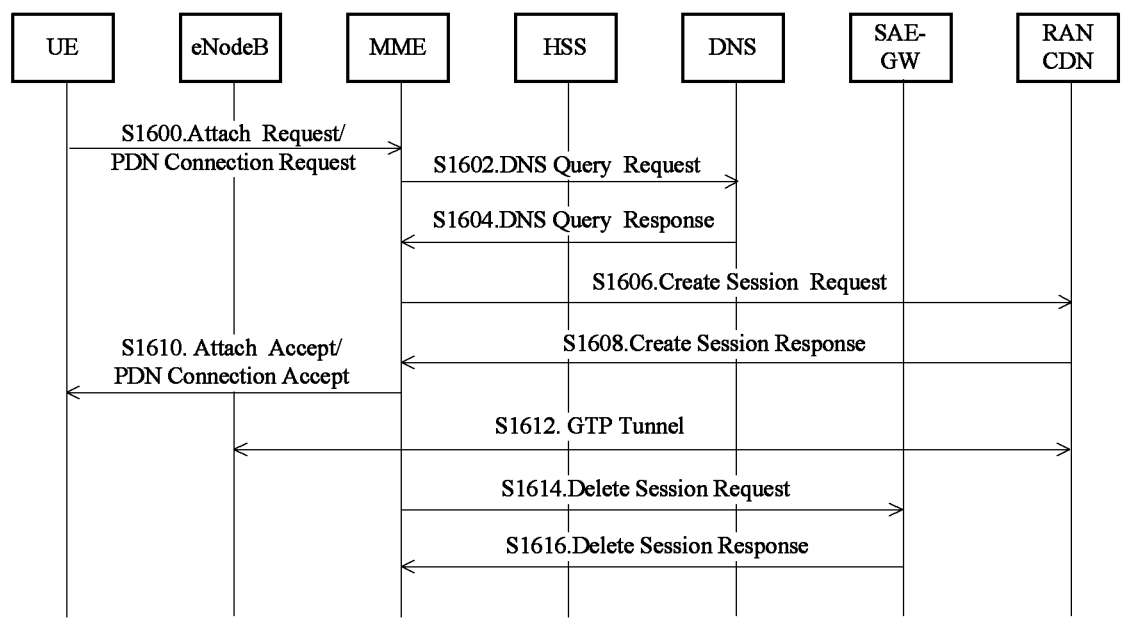
FIG. 16 is a flowchart of selection of an RAN CDN and service provision in an LTE scenario according to a second preferable embodiment of the present disclosure.

For combined deployment of a CDN and an SAE-GW (including an S-GW and a P-GW), a method for selecting an RAN CDN and providing service in an LTE scenario is described. As shown in FIG. 16, the method may include the following acts.

At act 1600, a UE may send an attach request/PDN connection request message to an MME, and the message may carry parameters such as an APN. In the embodiment, the APN may be an APN for activating an RAN CDN function.

At act 1602, the MME may send a DNS query request message to a DNS server.

In the preferable embodiment of the present disclosure, if the APN is the APN for activating the RAN CDN function, the SGSN may expand an APN domain name with an eNodeB ID in the DNS query request message. For example, the eNodeB ID may be internet.enb0001.epc.mnc021.mcc206.3gppnetwork.org, where enb0001 is an eNodeB of a coverage area where the UE is located.

In the present disclosure, if the APN is an APN of which the RAN CDN function is not activated, taking Blackberry as an example, the MME may continuously carry in the DNS query request message the original APN, e.g., blackberry.epc. mnc021.mcc206.3gppnetwork.org.

At act 1604, the DNS server may return a DNS query response message to the MME. In the present disclosure, the DNS query response message may carry an RAN CDN address.

In the present disclosure, the DNS server may need to modify a DNS resolution file, and a row of configuration records about a correspondence between an eNodeB ID and an IP address of an RAN CDN may be added. For example, the added configuration records may be as follows:

internet.enb0001.epc.mnc021.mcc206.3gppnetwork.org IN A 10.5.155.29//F or RAN-CDN APN;

blackberry.epc.mnc021.mcc206.3gppnetwork.org IN A 12.5.155.29//For Non RAN-CDN APN.

At act 1606, the MME may obtain the RAN CDN address from the DNS query response message, and may send a create session request message to the selected RAN CDN.

At act 1608, the RAN CDN may return a create session response message to the MME.

At act 1610, the MME may establish a bearer between the MME and the eNodeB. In this process, the MME may transmit the IP address of the RAN CDN and a TEID to the eNodeB. Then, a GTP-U tunnel between the eNodeB and the RAN CDN is successfully established. The MME may return an attach accept/PDN connection accept message to the UE.

At act 1612, the UE may send data packets to the RAN CDN through the eNodeB. The RAN CDN may process all data packets, but may cache packet data of which a destination port is 80, 8080, 8088 or 21 only, for convenience of subsequent direct provision of service for a user. The RAN CDN may support all functions relevant to a GTP-C and a GTP-U.

Moreover, the RAN CDN may support functions supported by all service nodes.

At act 1614, when the UE initiates a detach or PDN disconnection flow, the MME may send a delete session request message to the RAN CDN.

At act 1616, the RAN CDN may return a delete session response message to the MME.

To sum up, some embodiments of the present disclosure achieve the following effects. A problem that a network element supporting both a network function of a CDN and a mobile network cannot be selected to process a packet data service in a current system may be solved, thereby extending network functions of an LTE. A way of processing a current packet data service is also provided.

In another embodiment, software is provided. The software may be used to execute the solution described in the abovementioned embodiments and preferable implementation manners.

In another embodiment, a storage medium is provided. The abovementioned software is stored in the storage medium. The storage medium may include, but is not limited to, an optical disk, a floppy disk, a hard disk, an erasable memory and the like.

It is important to note that the specification and claims of the present disclosure and terms 'first', 'second' and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms 'including' and 'having' and any inflexions thereof are intended to cover non-exclusive inclusions. For example, it is not limited for processes, methods, systems, products or devices containing a series of acts or units to clearly list those acts or units, and other acts or units which are not clearly listed or are inherent to these processes, methods, products or devices may be included instead.

Obviously, a person skilled in the art shall understand that all of the abovementioned modules or acts in the present disclosure may be implemented by using a general calculation apparatus, may be centralized on a single calculation apparatus or may be distributed on a network composed of a plurality of calculation apparatuses. Alternatively, they may be implemented by using executable program codes of the calculation apparatuses. Thus, they may be stored in a storage apparatus and executed by the calculation apparatuses, the shown or described acts may be executed in a sequence different from this sequence under certain conditions, or they are manufactured into each integrated circuit module respectively, or multiple modules or acts therein are manufactured into a single integrated circuit module. Thus, the present disclosure is not limited to a combination of any specific hardware and software.

The above is only the preferable embodiments of the present disclosure, and not intended to limit the present disclosure. As will occur to a person skilled in the art, the present disclosure is susceptible to various modifications and changes. Any modifications, equivalent replacements, improvements and the like made within the principle of the present disclosure shall fall within the scope of protection defined by the appended claims of the present disclosure.

INDUSTRIAL APPLICABILITY

The abovementioned solution provided in some embodiments of the present disclosure may be applied to a process for a packet data service. A solution of preferentially selecting, when an RAN CDN has been enabled in a UMTS, an RAN CDN to process a packet data service in a current UMTS and LTE system is adopted. Therefore, a problem that a network element supporting both a network function of a CDN and a network function of a mobile network cannot be selected to process a packet data service in a current system may be solved, thereby extending network functions of the UMTS, the LTE system and the CDN. A way of accelerating processing of a current packet data service is also provided.

What is claimed is:

1. A system for processing a packet data service, comprising:

a Serving General Packet Radio Service (GPRS) Support Node (SGSN), configured to acquire at least one of an Access Point Name (APN) and a Radio Network Controller (RNC) identifier in a Universal Mobile Telecommunications System (UMTS), and select, when a Radio Access Network Content Delivery Network (RAN CDN) has been enabled in the UMTS, the RAN CDN according to at least one of the APN and the RNC identifier to process a packet data service in a UMTS network; and, a Mobility Management Entity (MME), configured to acquire at least one of an Access Point Name (APN) and an evolved NodeB (eNodeB) identifier in a Long-Term Evolution (LTE), and select, when a Radio Access Network Content Delivery Network (RAN CDN) has been enabled in the LTE, the RAN CDN according to at least one of the APN and the eNodeB identifier to process a packet data service in an LTE network, wherein in a case that the system comprises the SGSN, the system further comprises:

a Domain Name System (DNS), connected with the RAN CDN, and configured to send an IP address of the RAN CDN to the SGSN, wherein the SGSN is further configured to send a Packet Data Protocol (PDP) request to the RAN CDN corresponding to the IP address, and the PDP request is used for requesting the RAN CDN to process packet data received by the RAN CDN.

2. The system as claimed in claim 1, wherein in a case that the system comprises the SGSN, the SGSN is further configured to select, when the RAN CDN has not been enabled in the UMTS, a Gateway GPRS Support Node (GGSN) corresponding to the APN according to the APN to process the packet data service in the UMTS network.

3. The system as claimed in claim 1, wherein in a case that the system comprises the SGSN, the SGSN is further configured to select the RAN CDN according to at least one of the APN and the RNC identifier in a following manner: when the RAN CDN has been enabled in the UMTS, selecting, in a specified network determined according to the APN, the RAN CDN connected with an RNC in accordance with a topological connection relation of the specified network, wherein the RNC is indicated by the RNC identifier.

4. The system as claimed in claim 1, wherein in a case that the system comprises the SGSN, the system further comprises:

the RAN CDN, wherein the RAN CDN comprises: a CDN and a GGSN, wherein the CDN and the GGSN interact through a Transmission Control Protocol/Internet Protocol (TCP/IP).

5. The system as claimed in claim 1, wherein in a case that the system comprises the MME, the MME is further configured to select, when the RAN CDN has not been enabled in the LTE, a System Architecture Evolution Gateway (SAE-GW) corresponding to the APN according to the APN to process the packet data service in the LTE network.

6. The system as claimed in claim 1, wherein in a case that the system comprises the MME, the MME is further configured to select, when the RAN CDN has been enabled in the LTE, select, in a specified network determined according to the APN, the RAN CDN connected with an eNodeB in accordance with a topological connection relation of the specified network, wherein the eNodeB is indicated by the eNodeB identifier.

7. The system as claimed in claim 1, wherein in a case that the system comprises the MME, the system further comprises:
the RAN CDN, wherein the RAN CDN comprises: a CDN and a System Architecture Evolution Gateway (SAE-GW), wherein the CDN and the SAE-GW interact through a Transmission Control Protocol/Internet Protocol (TCP/IP).

8. The system as claimed in claim 1, wherein in a case that the system comprises the MME, the system further comprises:
a Domain Name System (DNS), connected with the RAN CDN, and configured to send an IP address of the RAN CDN to the MME,
wherein the MME is further configured to send a Packet Data Protocol (PDP) request to the RAN CDN corresponding to the IP address, and the PDP request is used for requesting the RAN CDN to process packet data received by the RAN CDN.

9. A method for processing a packet data service, comprising:
acquiring at least one of an Access Point Name (APN) and a Radio Network Controller (RNC) identifier in a Universal Mobile Telecommunications System (UMTS); and when a Radio Access Network Content Delivery Network (RAN CDN) has been enabled in the UMTS, selecting the RAN CDN according to at least one of the APN and the RNC identifier to process a packet data service in a UMTS network; and, acquiring at least one of an Access Point Name (APN) and an evolved NodeB (eNodeB) identifier in a Long-Term Evolution (LTE); and when a Radio Access Network Content Delivery Network (RAN CDN) has been enabled in the LTE, selecting the RAN CDN according to at least one of the APN and the eNodeB identifier to process a packet data service in an LTE network, wherein after selecting the RAN CDN according to at least one of the APN and the RNC identifier or after selecting the RAN CDN according to at least one of the APN and the eNodeB identifier, the method further comprises:
sending a Domain Name System (DNS) query request to a DNS, and receiving a DNS query response message corresponding to the DNS query request;
acquiring an IP address of the RAN CDN from the DNS query response message; and
sending a Packet Data Protocol (PDP) request to the RAN CDN corresponding to the IP address, wherein the PDP request is used for requesting the RAN CDN to process packet data received by the RAN CDN.

10. The method as claimed in claim 9, wherein in a case that at least one of the APN and the RNC identifier in the UMTS is acquired, the method further comprises:
when the RAN CDN has not been enabled in the UMTS, selecting a Gateway General Packet Radio Service (GPRS) Support Node (GGSN) corresponding to the APN according to the APN to process the packet data service in the UMTS network.

11. The method as claimed in claim 9, wherein in a case that at least one of the APN and the RNC identifier in the UMTS is acquired, selecting the RAN CDN according to at least one of the APN and the RNC identifier comprises:
selecting, in a specified network determined according to the APN, the RAN CDN connected with an RNC in accordance with a topological connection relation of the specified network, wherein the RNC is indicated by the RNC identifier.

12. The method as claimed in claim 9, wherein in a case that at least one of the APN and the RNC identifier in the UMTS is acquired, the RAN CDN is obtained in a following manner:
taking a network element supporting a GGSN and a CDN as the RAN CDN, wherein the CDN and the GGSN interact through a Transmission Control Protocol/Internet Protocol (TCP/IP).

13. The method as claimed in claim 9, wherein in a case that at least one of the APN and the RNC identifier in the UMTS is acquired, a network function of the RAN CDN comprises: a network function supported by a GGSN, a network function supported by an edge CDN, and a transparent cache.

14. The method as claimed in claim 9, wherein in a case that at least one of the APN and the eNodeB identifier in the LTE is acquired, the method further comprises:
when the RAN CDN has not been enabled in the LTE, selecting a System Architecture Evolution Gateway (SAE-GW) corresponding to the APN according to the APN.

15. The method as claimed in claim 9, wherein in a case that at least one of the APN and the eNodeB identifier in the LTE is acquired, selecting the RAN CDN according to at least one of the APN and the eNodeB identifier comprises:
when the RAN CDN has been enabled in the LTE, selecting, in a specified network determined according to the APN, the RAN CDN connected with an eNodeB in accordance with a topological connection relation of the specified network, wherein the eNodeB is indicated by the eNodeB identifier.

16. The method as claimed in claim 9, wherein in a case that at least one of the APN and the eNodeB identifier in the LTE is acquired, the RAN CDN is obtained in a following manner:
taking a network element supporting an SAE-GW and a CDN as the RAN CDN, wherein the CDN and the SAE-GW interact through a Transmission Control Protocol/Internet Protocol (TCP/IP).

17. The method as claimed in claim 9, wherein in a case that at least one of the APN and the eNodeB identifier in the LTE is acquired, a network function of the RAN CDN comprises: a network function supported by an SAE-GW, a network function supported by an edge CDN, and a transparent cache.

18. An apparatus for processing a packet data service, comprising a hardware processor arranged to execute program modules comprising an acquisition module and a selection module, wherein:

the acquisition module is configured to acquire at least one of an Access Point Name (APN) and a Radio Network Controller (RNC) identifier in a Universal Mobile Telecommunications System (UMTS); and the selection module is configured to select, when a Radio Access Network Content Delivery Network (RAN CDN) has been enabled in the UMTS, the RAN CDN according to at least one of the APN and the RNC identifier to process a packet data service in a UMTS network; and acquisition module is configured to acquire at least one of an Access Point Name (APN) and an evolved NodeB (eNodeB) identifier in a Long-Term Evolution (LTE); and the selection module is configured to select, when a Radio Access Network Content Delivery Network (RAN CDN) has been enabled in the LTE, the RAN CDN according to at least one of the APN and the eNodeB identifier to process a packet data service in an LTE network, wherein the acquisition module is further configured to send a Domain Name System (DNS) query request to a DNS, and receiving a DNS query response message corresponding to the DNS query request; acquire an IP address of the RAN CDN from the DNS query response message; and send a Packet Data Protocol (PDP) request to the RAN CDN corresponding to the IP address, wherein the PDP request is used for requesting the RAN CDN to process packet data received by the RAN CDN.

* * * * *